United States Patent

Füssner et al.

[11] 3,969,044
[45] July 13, 1976

[54] FUEL PUMP ASSEMBLY

[75] Inventors: Paul Füssner, Sindelfingen; Horst Salmanzig, Ludwigsburg, both of Germany

[73] Assignee: Robert Bosch G.m.b.H., Stuttgart, Germany

[22] Filed: Jan. 18, 1974

[21] Appl. No.: 434,575

[30] Foreign Application Priority Data

Jan. 26, 1973   Germany............................ 2303687

[52] U.S. Cl................................ 417/410; 417/366
[51] Int. Cl.²......................................... F04B 17/00
[58] Field of Search.................. 417/410, 366, 369; 64/10, 2 R, 1 V, 6; 403/252, 254, 261, 263; 418/102

[56] References Cited

UNITED STATES PATENTS

| | | | |
|---|---|---|---|
| 975,532 | 11/1910 | Keller | 417/366 |
| 3,212,449 | 10/1965 | Whalen et al. | 417/410 |
| 3,754,844 | 8/1973 | Nusser et al. | 417/423 R |
| 3,801,231 | 4/1974 | Nusser et al. | 417/410 |

FOREIGN PATENTS OR APPLICATIONS

| | | | |
|---|---|---|---|
| 1,041,153 | 10/1953 | France | 417/423 |
| 949,070 | 2/1964 | United Kingdom | 417/423 |
| 322,778 | 12/1929 | United Kingdom | 418/102 |

OTHER PUBLICATIONS

Winfred M. Berg, Inc., Catalog, 1970, p. 2.

*Primary Examiner*—Carlton R. Croyle
*Assistant Examiner*—O. T. Sessions
*Attorney, Agent, or Firm*—Michael J. Striker

[57] ABSTRACT

A fuel pump assembly wherein an elongated tubular housing surrounds a fuel pump and an electric motor and has a fuel-admitting inlet at one end and a fuel-discharging outlet at the other end. The rotor of the electric motor drives the pump rotor through the medium of several axially parallel elastic pins which extend into complementary sockets of the pump rotor. The pump rotor rotates directly on a shaft which is fixedly mounted in the housing. The rotor of the electric motor rotates on several friction bearings consisting of sinter metal and surrounding the fixedly mounted shaft. The pins form part of an elastomeric casing which surrounds a portion of or the entire rotor of the electric motor. Some fuel flows from the pressure side of the pump into an annular space between the shaft and the pump rotor and thence toward the outlet by flowing through the bearings as well as through a sleeve which supports the rotor of the electric motor and rotates with the bearings.

11 Claims, 2 Drawing Figures

3,969,044

FUEL PUMP ASSEMBLY

CROSS-REFERENCE TO RELATED APPLICATION

The apparatus of the present invention constitutes an improvement over and a further development of apparatus disclosed in the commonly owned U.S. Pat. No. 3,873,243 as well as an improvement over and a further development of apparatus disclosed in the commonly owned U.S. Pat. No. 3,870,910.

BACKGROUND OF THE INVENTION

The present invention relates to fluid conveying apparatus in general, and more particularly to improvements in assemblies wherein a pump driven by an electric motor, conveys a liquid, especially a liquid fuel.

The copending application of Nusser et al. discloses a fuel pump assembly wherein the pump and the electric motor are installed in a common housing and the rotors of the pump and electric motor rotate about a fixed shaft. The rotor of the pump is integral with an element of the rotor of the electric motor. It is further known to provide a discrete coupling which transmits torque from the rotor of the electric motor to the pump rotor. The wear on such couplings is extensive so that the radial and/or tangential play of the rotary parts increases beyond a permissible value after a relatively short period of use of the pump assembly. It has been observed that the pump assembly which embodies such a coupling is likely to become inoperative at the most inopportune time and that the generation of noise increases disproportionately as the wear upon the coupling progresses.

SUMMARY OF THE INVENTION

An object of the invention is to provide an apparatus wherein a liquid-displacing pump is driven by an electric motor with novel and improved means for transmitting torque from the rotary parts of the motor to the rotary part or parts of the pump.

Another object of the invention is to provide a pump assembly, particularly a pump assembly for conveying a liquid fuel, whose operation is quieter than that of presently known assemblies, even after extended periods of use of the improved assembly.

A further object of the invention is to provide a fuel pump assembly wherein the torque-transmitting connection between the rotary elements of the motor and the pump rotor is simpler, less expensive, more reliable and longer-lasting than the aforedescribed conventional connections.

An additional object of the invention is to provide a fuel pump assembly wherein the rotary elements of the motor can transmit torque to the pump rotor through the medium of a very simple and inexpensive connection which allows for replacement of component parts of the pump independently of the electric motor or vice versa.

Still another object of the invention is to provide a pump assembly for conveying liquids which requires a minimum of maintenance, wherein the conveyed liquid can be used with advantage to cool and/or lubricate the parts which move with respect to each other, and wherein the wear upon bearings and like parts is less pronounced than in many heretofore known pump assemblies.

A further object of the invention is to provide a pump assembly wherein the fluctuations in the rate of liquid flow are less pronounced than is known pump assemblies, which is capable of automatically regulating the pressure of conveyed liquid, and wherein the motor contributes to a more satisfactory lubrication of bearings and/or other rotary parts.

The invention is embodied in an apparatus for conveying a liquid, particularly in a fuel pump assembly, which comprises a housing having a liquid-admitting inlet at one end and a liquid-discharging outlet at the other end thereof, a shaft which is fixedly (non-rotatably) mounted in the housing, an electric motor which is installed in the housing and has a first rotor mounted on and rotatable relative to the shaft, a pump installed in the housing and having a second rotor which is mounted on and is rotatable relative to the shaft to thereby cause a liquid to flow from the inlet, through the housing, and toward and through the outlet, and elastic torque-transmitting means which connects the two rotors. The torque-transmitting means may form part of one of the rotors (preferably the first rotor) and is coupled to the other rotor. In accordance with a presently preferred embodiment, the first rotor comprises a substantially cylindrical extension which surrounds the shaft between the pump and the first rotor and the torque-transmitting means forms part of the cylindrical extension. Such torque-transmitting means may comprise at least one elastic pin-shaped projection (for example, five projections) which is parallel to the shaft and extends into a complementary socket of the second rotor. The aforementioned cylindrical extension may constitute an integral part of a synthetic plastic casing which surrounds a portion of or the entire first rotor and rotates therewith when the electric motor is on to drive the second rotor. The second rotor may consist of sintered material.

The novel features which are considered as characteristic of the invention are set forth in particular in the appended claims. The improved pump assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
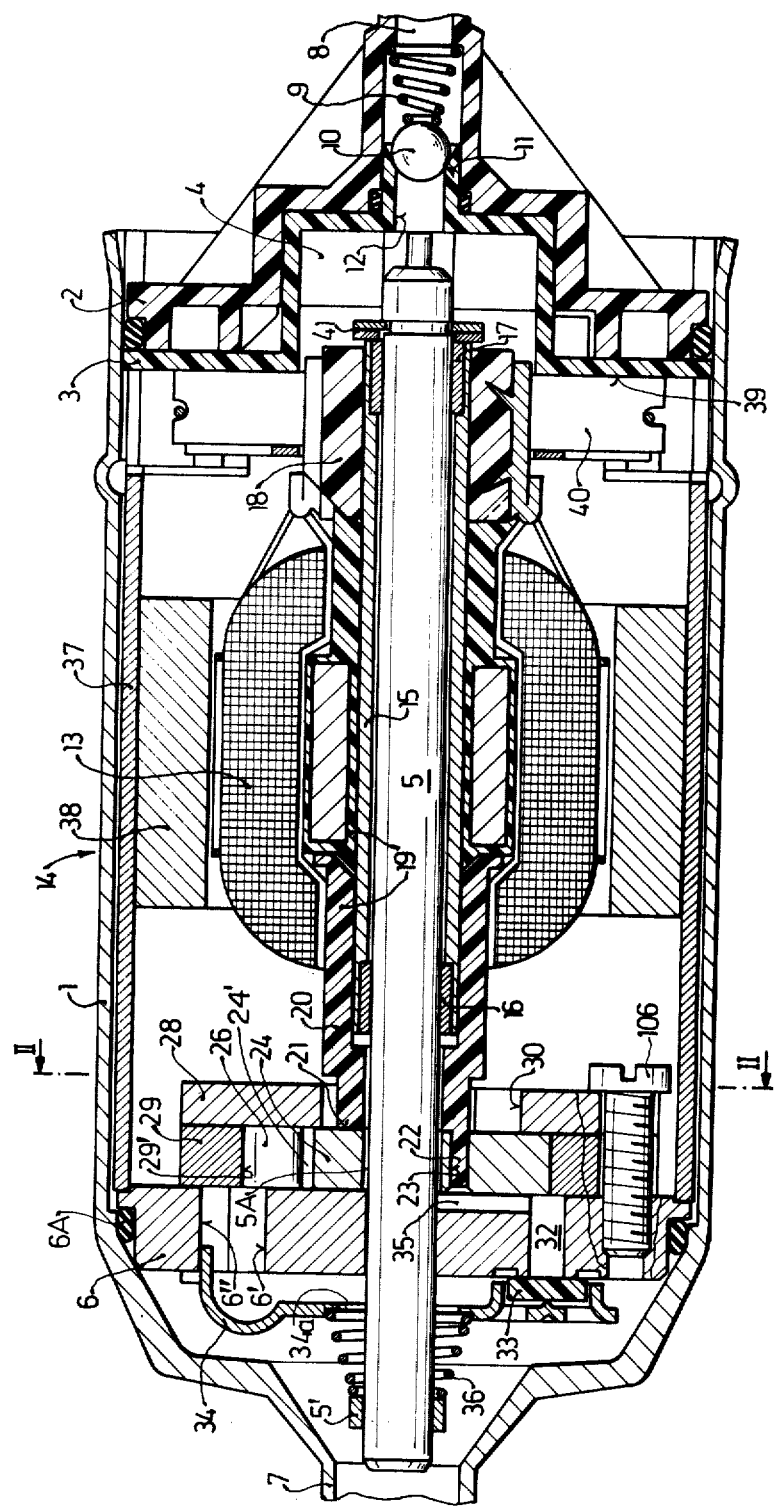
FIG. 1 is an axial sectional view of a fuel pump assembly which embodies the invention.
Figure 2:
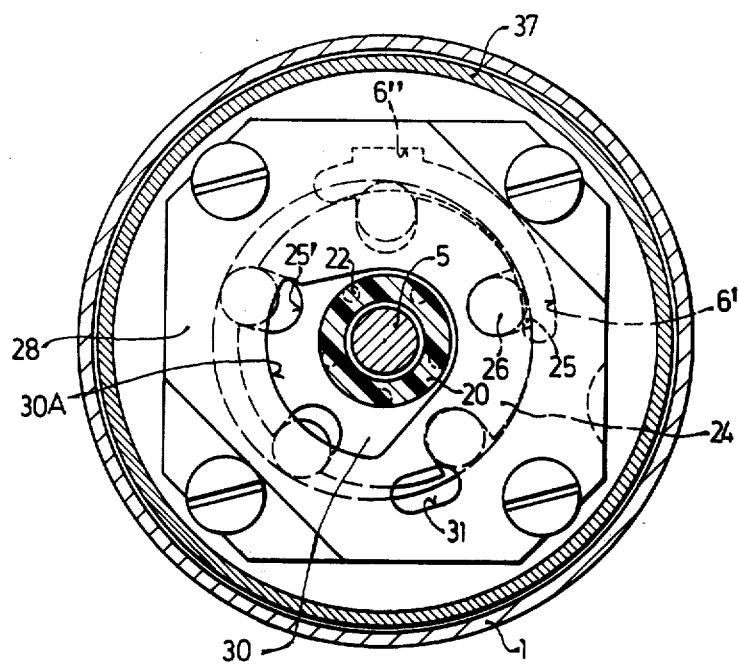
FIG. 2 is a transverse sectional view as seen in the direction of arrows from the line II—II of FIG. 1.

FIGS. 1 and 2 show an apparatus which constitutes a fuel pump assembly and comprises a housing including an elongated cupped main section 1 and a second section 2 constituting a closure or plug for the right-hand end of the main section 1, as viewed in FIG. 1. The closure 2 abuts against and partially surrounds a bearing member or insert 4 having a radially outwardly extending flange 3 which abuts against the internal surface of the main housing section 1. A ring-shaped sealing element 3a is interposed between the flange 3 and the adjacent radially outermost portion of the closure 2. The main section 1 is made of a suitable metal, and the parts 2, 4 consist of a synthetic plastic material. The central portion of the bearing member 4 contains or includes a support for the right-hand end of a fixed shaft 5 which extends through the central portion of the entire main housing section 1. A portion of the shaft 5 which is close to its left-hand end, as viewed in FIG. 1, is fixedly mounted in a stationary part 6 of a fuel pump serving to draw fuel through an inlet 7 at the left-hand axial end of the main housing section 1 and to convey such fuel toward an outlet 8 at the right-hand axial end of the closure 2. The stationary part 6 of the fuel pump resembles a disk which is surrounded by an annular seal 6A engaging the internal surface of the adjacent portion of the main housing section 1. The cross-sectional area of the main housing section 1 decreases in a direction from the seal 6A toward the inlet 7.

A check valve is installed partly in the closure 2 and partly in the bearing member 4; its purpose is to prevent a return flow of fuel into the housing via outlet 8. This valve comprises a spherical valve member 10 which is biased against a seat 11 of the bearing member 4 by a valve spring 9 reacting against an internal shoulder of the closure 2. The valve member 10 normally prevents the flow of fuel from an axial bore 12 of the bearing member 4 into the outlet 8 but the check valve opens automatically in response to a rise in fuel pressure, i.e., when the pump is in operation to draw fuel into the housing 1, 2 via inlet 7.

The means for rotating the rotor 24 of the fuel pump is an electric motor 14 which is installed in the central portion of the main housing section 1 and comprises a rotor including an armature 13. The armature 13 is mounted on an elongated sleeve 15 which surrounds the major part of the shaft 5. The end portions of the sleeve 15 have friction bearings or sleeve bearings 16, 17 which directly engage the respective portions of the peripheral surface of the shaft 5. The material of the bearings 16, 17 is preferably a sinter metal. The armature 13 includes customary windings and laminae, and the rotor of the electric motor 14 further includes a commutator 18 which is adjacent to the right-hand axial end of the shaft 5, as viewed in FIG. 1.

At least a portion of the armature 13 is surrounded by a casing 19 which preferably consists of an elastomeric synthetic plastic material and has a cylindrical extension 20 surrounding the sleeve 15 in the region of the bearing 16. In the illustrated embodiment, the casing 19 surrounds the laminae but not the windings of the armature 13. The front end face 21 of the extension 20 of the casing 19 (which constitutes an element of the rotor of the electric motor 14) is located to the left of the sleeve 15 and its bearing 16 and is provided with five integral equidistant axially parallel elastic projections or pins 22 extending into complementary sockets 23 provided in the rotor 24 of the fuel pump. The rotor 24 is mounted with clearance on the adjacent portion of the shaft 5 so that the parts 5, 24 define an elongated annular space 5A. As shown in FIG. 2, the rotor 24 is formed with several radially outwardly extending slots 25 for cylindrical or roller-shaped liquid displacing elements 26. The rotor 24 is mounted between the aforementioned stationary part 6 of the fuel pump and a second disk-shaped stationary part 28 which is bolted (as at 10b) or otherwise connected to the part 6. A distancing element 29 between the stationary parts 6, 28 of the fuel pump surrounds the rotor 24 and has a cylindrical internal surface 29' along which the liquid displacing elements 26 roll when the rotor 24 is driven. The cylindrical internal surface 29' is eccentric with respect to the shaft 5 which latter is coaxial with the pump rotor 24.

The stationary part 28 is formed with a radially outwardly extending cutout 30 (see particularly FIG. 2) and with a slot 31 which is adjacent to but spaced from one end of the radially outermost portion of the cutout 30. The stationary part 6 is further formed with an axially parallel channel 32 the outer end of which is normally sealed by the plate-like valve member 33 of a relief valve serving to allow fuel to flow back toward the inlet 7 when the fuel pressure in the pump reaches a predetermined value. The valve member 33 is mounted at one end of a yoke-like support 34 the other end of which extends into a notch 6'' communicating with a kidney-shaped slot 6' of the stationary part 6. The support 34 may consist of sheet metal and its central portion has an opening 34a receiving with substantial clearance the adjacent portion of the shaft 5. The valve member 33 is biased against the outer end of the channel 32 in the stationary part 6 by a helical spring 36 which reacts against a retainer 5' on the shaft 5 and bears against the central portion of the support 34 in the region of the opening 34a.

The disk-shaped stationary part 28 of the fuel pump has a relatively large central opening forms part of the cutout 30 and which receives with clearance the leftmost portion of the cylindrical extension 20 of the elastomeric casing 19.

A cylindrical sheet-metal sleeve 37 of magnetically conductive material surrounds the rotor of the electric motor 14 in the main housing section 1 and carries permanent magnets 38 forming parts of the motor 14 and surrounding the windings of the armature 13. The flange 3 of the bearing member 4 has radially extending recesses or pockets for carbon brushes 40 which bear against the commutator 18. The rotor of the motor 14 is held against axial movement relative to the shaft 5 by the rotor 24 of the fuel pump and by one or more split rings 41 which are recessed into a circumferential groove of the shaft 5 to the right of the bearing 17, as viewed in FIG. 1.

The cutout 30 of the pump rotor 24 is bounded at its outer end by a concave surface 30A which forms part of a cylinder and whose radius of curvature is less than the radius of the rotor 24. The radial slots 25 of the rotor 24 are bounded at their inner ends by concave surfaces 25' which are located radially inwardly of the arcuate surface 30A.

When the electric motor 14 is started, its rotor including the armature 13, commutator 18 and casing 19 rotates on the shaft 5 and the torque-transmitting projections 22 drive the rotor 24 of the fuel pump in the main housing section 1. As the member 24 rotates, the displacing elements 26 roll along the cylindrical internal surface 29' of the distancing element 29 which performs a function similar to that of the slide block in a radial piston pump. The elements 26 draw fuel into the main housing section 1 via inlet 7 whereby such fuel flows through the kidney-shaped slot 6' of the stationary part 6, into the adjacent radial slots 25 of the rotor 24 and thereupon into the cutout 30. The fuel flows from the cutout 30, around the rotor of the electric motor 14 and into the bore 12 of the bearing member 4 to open the check valve including the spherical valve member 10 and to leave the housing via outlet 8. If the fuel pressure in the interior of the housing 1, 2 reaches a predetermined value, the valve member 33 is lifted off the left-hand end of the channel 32 and permits some fuel to flow back toward the inlet 7.

The configuration of the cutout 30 in the stationary part 28 of the fuel pump is selected with a view to insure a highly satisfactory rinsing of the radial slots 25 in the region of the respective concave surfaces 25'. Furthermore, a cutout having a configuration as shown at 30 in FIG. 2 insures that eventual bubbles of steam or another gas which develop in the fuel are caused to rapidly leave the region of the fuel pump.

As the fuel flows radially in the cutout 30 as well as through the slot 31 in the stationary part 28 of the fuel pump, there develops a slight rise of fuel pressure in a plenum or liquid filled working chamber, that is, the enclosed space 24' which surrounds the rotor 24 and is surrounded by the surface 29'. That face of the stationary part 6 which is adjacent to the rotor 24 has a radially extending groove or passage 35 wherein the fuel can flow from the plenum chamber 24' surrounding the rotor 24 into the space 5A between the rotor 24 and shaft 5. The groove 34 is machined into that portion of the stationary part 6 which communicated with the region where the pressure of the body of fuel surrounding the rotor 24 reaches a maximum value. The fuel which enters the space 5A flows through the sinter metal bearing 16, thereupon through the space between the shaft 5 and sleeve 15, through the sinter bearing 17, and into the outlet 8. Such fuel insures a highly satisfactory lubrication of the bearings for the rotor of the electric motor 14 and a cooling of such bearings.

The rotor of the electric motor 14 acts not unlike a centrifugal pump and causes some fuel to flow in a direction from the periphery of the shaft 5 toward the internal surface of the sleeve 37. This draws additional fuel into the space 5A and thence through the parts 16, 15, 17 to thus enhance the cooling action of fuel upon the bearings on which the rotor of the electric motor 14 rotates. Moreover, such centrifugal pumping action of the rotor of the electric motor 14 causes eventually developing bubbles of gas to flow away from the bearings, which is particularly important when the pump assembly is used to convey fuel for Otto engines at elevated temperatures. The evacuation of bubbles from the region of the shaft 5 prolongs the useful life of the bearings for the rotor of the electric motor 14.

The number of elastomeric projections 22 which constitute the torque-transmitting means between the two rotors can be reduced below or increased above five. Also, these projections can be made integral or rigid with the rotor 24 of the pump and then extend into suitable complementary sockets of the rotor of the electric motor 14. The arrangement which is shown in the drawing is preferred at this time because the projections 22 can be formed as integral parts of the casing 19 which constitutes a useful component of the rotor of the electric motor 14.

An important advantage of the improved pump assembly is that the wear on the torque-transmitting projections 22 is negligible. This is due to relatively low specific stressing of such projections in view of the fact that they consist of an elastomeric material. The elastic torque-transmitting projections further contribute to a reduction of fluctuations in the rate of fluid flow through the housing 1, 2 because they can yield whenever the torque which the rotor of the electric motor 14 tends to transmit to the rotor 24 of the fuel pump reaches a predetermined maximum value or peak value. Thus, the effect of eventual fluctuations in RPM of the armature 13 upon the rate of fluid flow is much less pronounced than in pump assemblies wherein the pump rotor is compelled to share all angular movements and invariably rotates at the exact speed of the rotary elements of the motor. Since the projections 22 can be withdrawn from the respective sockets 23, the motor 14 can be removed independently of the pump and the parts of the pump can be inspected and/or replaced independently of the motor. The pump assembly is less expensive than presently known pump assemblies wherein a complete coupling is needed to transmit torque to the pump rotor. Also, the provision of elastic torque-transmitting means contributes significantly to a reduction of noise, even after extended use of the pump assembly.

Another advantage of the improved pump assembly is that the rotor 24 of the fuel pump is mounted directly on the shaft 5. This renders it possible to reduce the radial play of the rotor 24 to a desirable minimum, i.e., to provide between the parts 5 and 24 a space 5A of desired width. The provision of one or more radial grooves 35 insures a highly satisfactory cooling of the parts which rotate on the shaft 5 and prolongs the useful life of bearings for the rotary parts of the electric motor 14. Also, the provision of the cutout 30 contributes to an expulsion of bubbles of steam or other gaseous medium from the region of the fuel pump.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In an apparatus for conveying a liquid, particularly fuel, a combination comprising a housing having a liquid admitting inlet and a liquid discharging outlet; a shaft fixedly mounted in said housing; an electric motor installed in said housing and including a first rotor mounted on and rotatable relative to said shaft; a pump installed in said housing and having a second rotor mounted on and rotatable relative to said shaft to thereby cause a liquid to flow from said inlet to said outlet, said second rotor having five axially extending sockets; said first rotor comprising a cylindrical extension extending short of said second rotor; and elastic torque-transmitting means connecting said rotors and comprising five discrete complementary projections for each of said sockets each projecting in axial direction from said cylindrical extension into each of said respective sockets of said second rotor.

2. A combination as defined in claim 1, wherein said projections are pins.

3. A combination as defined in claim 1, wherein said second rotor consists of sinter material.

4. A combination as defined in claim 1, wherein said second rotor defines a clearance and is rotatable directly on said shaft.

5. A combination as defined in claim 1, wherein said second rotor has an axial bore whose diameter exceeds the diameter of said shaft so that said shaft and said second rotor define an annular space.

6. A combination as defined in claim 5, wherein said pump comprises a stationary portion defining with said second rotor a working chamber for conveyed liquid and at least one passage connecting said chamber with said space.

7. A combination as defined in claim 13, further comprising bearings interposed between said shaft and said first rotor and arranged to receive liquid from said annular space whereby such liquid cools and lubricates said bearings.

8. A combination as defined in claim 7, wherein said bearings consist of sintered material.

9. A combination as defined in claim 1, wherein said projections are formed from elastomeric synthetic plastic material.

10. A combination as defined in claim 1, wherein said cylindrical extension and said projections are integrally formed from elastomeric synthetic plastic material.

11. In an apparatus for conveying a liquid, particularly fuel, a combination comprising a housing having a liquid admitting inlet and a liquid discharging outlet; a shaft fixedly mounted in said housing; an electric motor installed in said housing and including a first rotor comprising an armature, a commutator and a casing of elastomeric synthetic plastic material, said first rotor being mounted on and rotatable relative to said shaft; a pump installed in said housing and having a second rotor mounted on and rotatable relative to said shaft to thereby cause a liquid to flow from said inlet to said outlet, said casing comprising a cylindrical extension surrounding said shaft and ending short of said second rotor; and elastic torque-transmitting means forming an integral part of said casing of elastomeric synthetic plastic material and connecting said rotors, said elastic torque-transmitting means comprising at least one pin-shaped projection integral with and projecting axially from said cylindrical extension and a complementary socket in said second rotor receiving said pin-shaped projection.

* * * * *